United States Patent [19]

Riemann et al.

[11] Patent Number: 4,634,060
[45] Date of Patent: Jan. 6, 1987

[54] PROCESSING AND SORTING OF REFUSE

[75] Inventors: Hanns-Helmut Riemann, Bochum; Heinz-Josef Skaletz, Rechklinghausen; Hans Sonnenschein, Essen, all of Fed. Rep. of Germany

[73] Assignee: CMU-Gesellschaft fuer Materialrueckgewinnung, Essen, Fed. Rep. of Germany

[21] Appl. No.: 139,020

[22] Filed: Apr. 10, 1980

Related U.S. Application Data

[63] Continuation of Ser. No. 94,533, Nov. 15, 1979, abandoned.

[30] Foreign Application Priority Data

Nov. 15, 1978 [DE] Fed. Rep. of Germany ....... 2849509

[51] Int. Cl.$^4$ .......................................... B02L 13/06
[52] U.S. Cl. ...................................... 241/74; 241/79; 241/188 R
[58] Field of Search ................. 241/152 R, 152 A, 74, 241/79, 79.1, 188 R, 285 A, 285 R, 101.7, 501, 638

[56] References Cited

U.S. PATENT DOCUMENTS

| | | | |
|---|---|---|---|
| 1,458,387 | 6/1923 | Bourne | 241/5 |
| 3,061,205 | 10/1962 | Lavallée | 241/DIG. 38 |
| 3,990,643 | 11/1976 | Neitzel | 241/27 X |
| 4,009,834 | 3/1977 | Hahn et al. | 241/74 X |

Primary Examiner—Howard N. Goldberg
Assistant Examiner—Timothy V. Eley
Attorney, Agent, or Firm—Ralf H. Siegemund

[57] ABSTRACT

A rotating drum on a carriage has one end portion constructed as a chopping chamber, the major part of the drum's periphery serving as a sieve. The interior of the drum is subjected to suction for the removal of floating components. Refuse components, which are not chopped nor removed by the sieve periphery of the drum, are discharged axially via a funnel. The unit is a mobile one.

7 Claims, 2 Drawing Figures

PROCESSING AND SORTING OF REFUSE

This is a continuation of Ser. No. 94,533, filed Nov. 15, 1979, now abandoned.

BACKGROUND OF THE INVENTION

The invention relates to the processing, dressing, and separating of refuse.

A known dressing device includes a hammer roll for chopping and being disposed in a rotating drum (see: "Der Städtetag" (a magazin), issue 5, 1975; and elsewhere). This chopping device discharges the chopped and mixed refuse onto a conveyor belt which, in turn, carries the material to an oscillating sieve. The sieve separates the various constituents of the refuse from each other. It was found that regular household refuse includes quite frequently relatively light materials, such as plastic foils, or the like, which are not well chopped up in this manner. This type of refuse adheres readily to other components, or wraps itself around heavier refuse parts and, thus, impedes chopping of the latter; sieving becomes, accordingly, more difficult.

DESCRIPTION OF THE INVENTION

It is an object of the present invention to provide a device for processing refuse under utilization of chopping and sieving, in which components are separated prior to, during, as well as subsequent to chopping.

In accordance with the preferred embodiment of the present invention, it is suggested to provide a rotating drum means on a frame structure being preferably constructed as a carriage. The drum means includes a first drum, housing a hammer roll and participating in the chopping of refuse being charged into the first drum, preferably from one axial end. The first drum continues in a second, aerating, or loosening drum, connected to a suction device for the removal of floatable refuse components. Heavier components are removed otherwise, under inclusion of sieving, preferably by constructing the loosening drum as a sieve through which chopped, heavier components are removed on a running basis, while still heavier and unchopped refuse components are discharged by a funnel at the axial end of the loosening drum. The requisite suction is preferably applied at that end. As a consequence, one obtains a three-component separation, in which the light-weight separation begins already prior to chopping by operation of suction. The apparatus is, thus, of a high-performance but compact variety and can be constructed as a mobile unit.

DESCRIPTION OF THE DRAWINGS

While the specification concludes with claims, particularly pointing out and distinctly claiming the subject matter which is regarded as the invention, it is believed that the invention, the objects and features of the invention, and further objects, features, and advantages thereof, will be better understood from the following description taken in connection with the accompanying drawings, in which:

Figure 1:
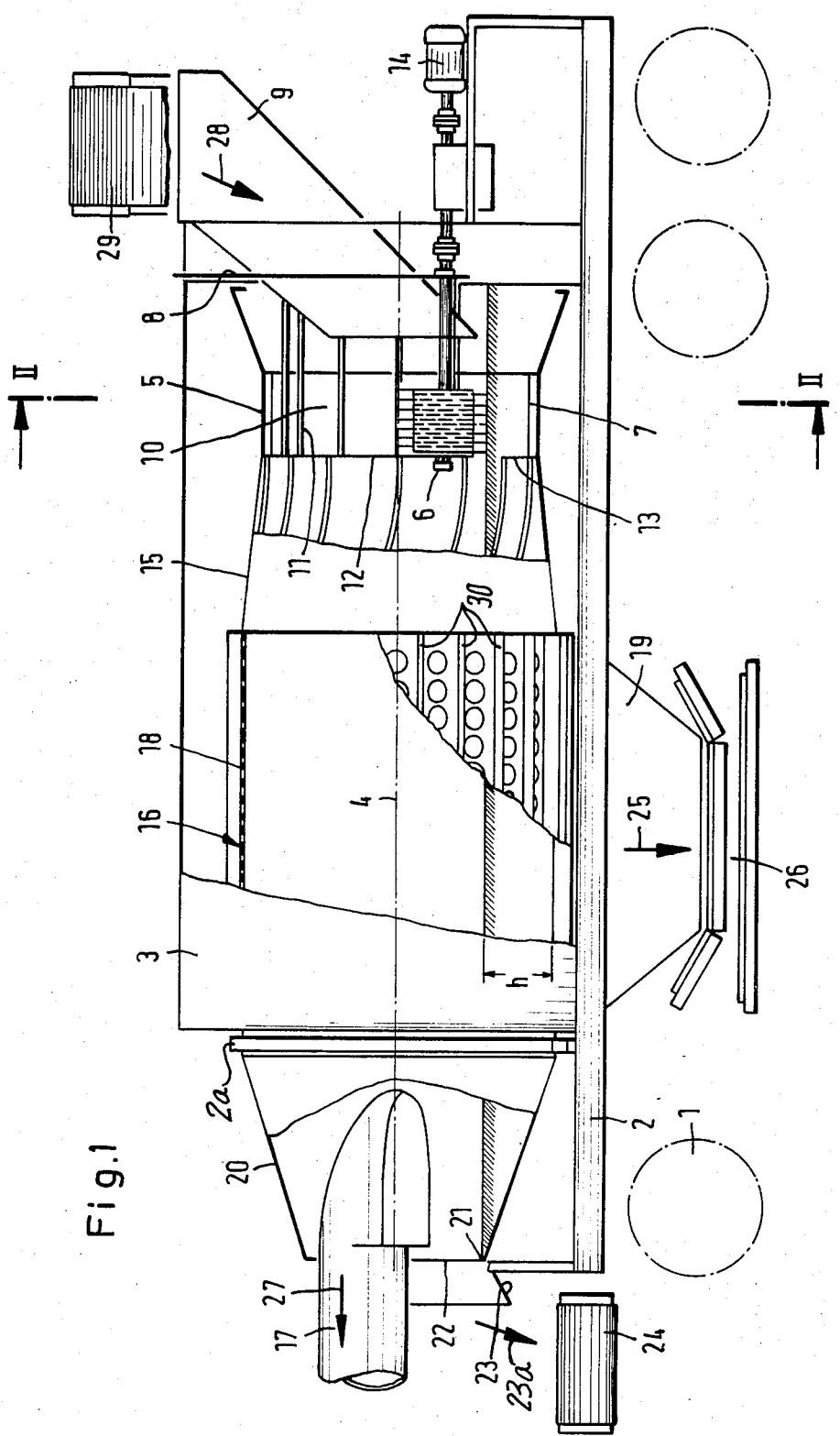
FIG. 1 is a schematic view of a longitudinal section of a device for dressing refuse, being arranged on a carriage and including means for chopping, sieving, and sorting refuse.
Figure 2:
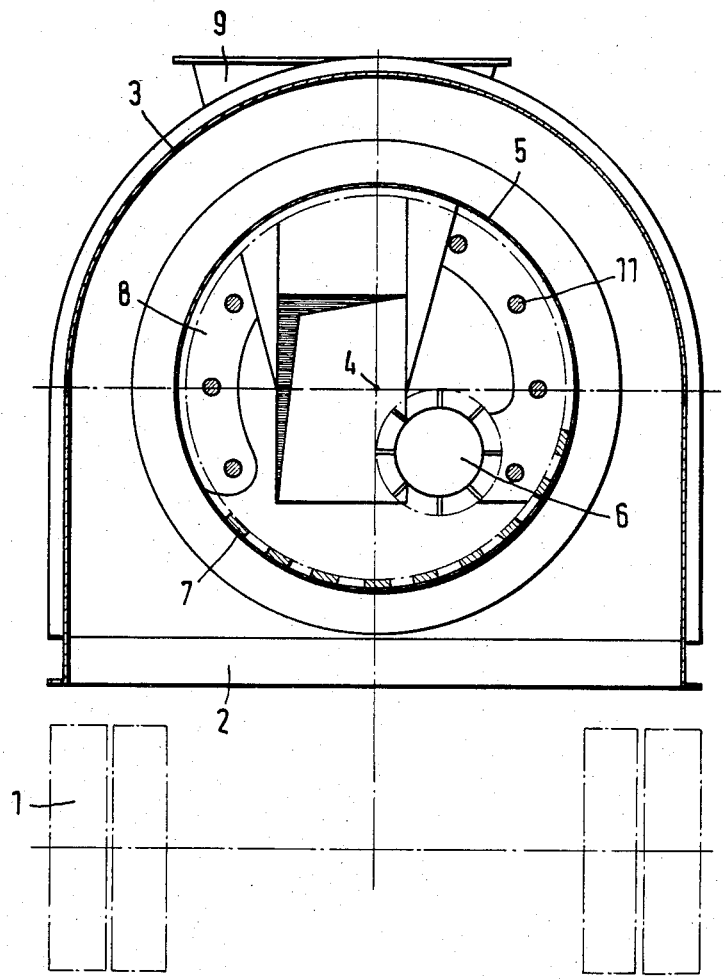
FIG. 2 is a section view taken along lines II—I in FIG. 1.

Proceeding now to the detailed description of the drawings, the figures illustrate a frame or platform 2 on, or being part of, a carriage 1, which is represented here by wheels only. Frame 2 carries a jacket or container 3, having a size and contour resembling a garbage truck. A hollow drum structure 16 is rotatably mounted in container 3, for rotation about an axis 4. The drive for the drum has been omitted; it is a conventional one.

The drum structure 16 includes a first drum 5 which contains other components of a chopping device. A principal component here is a drum for a mill hammer 6, being disposed off axis 4. A ribbed, armor lining 7 of drum 5 is another component of the chopping device. Hammer drum and ribbed armoring are known per se and constitute the principal structure for chopping refuse.

An arc-shaped frame 8 is also disposed at the right-hand end of container 3. The side of frame 8, facing away from drum 5, carries a charge funnel or hopper 9. Hopper 9 has a horizontally oriented entrance and charge opening above which ends a conveyor belt 29 for feeding refuse into the hopper. The conveyor belt 29 is separated from the mobile units 1, 2, etc., but may itself be a mobile unit for placement in relation to the refuse processing apparatus.

The other side of frame 8 is constructed of, or constitutes a wall, or the like, of a chopping chamber 10. Frame 8 carries, in particular, a circular partition 12 by means of protruding bolts 11. The lower portion of wall or partition 12 is constructed and contoured as a discharge exit 13. Hammer drum 6 is contained in that chamber 10 and located quite closely to exit opening 13 in partition 12.

Frame 8 serves, in part, also as support for the drive shaft of hammer 6. This drive shaft, journalled in frame 8, projects from a motor 14 which is also suitably mounted onto the carriage and its platform 2. Generally speaking, frame 8 with its appended devices (6, 9, 12, 14) constitutes a stationary structure assembly to be mounted onto the carriage-plus-platform unit; this assembly can, in part, be inserted as a unit into drum 5.

Drum 5 is integrally continued in a loosening drum 15. The drum devices 5 and 15 together constitute drum unit 16. This drum unit 16 is journalled in a frame part 2a; other support structure (not shown) for drum 16 is disposed inside case 3, more to the right of the drawing. A suction head 17 is disposed adjacent to the other end of unit 16, drum 15, and is mounted onto the left-hand end of the frame and platform 2. This suction head 17 pertains to a blower being connected to a cyclon. Thus, air is continuously sucked out of the interior of drum means 16 and out of the system.

A portion of drum 15, axially offset from drum 5, is constructed as a drum-shaped sieve. The case and container 3 unit is provided with a discharge chute 19 adjacent to sieve perforations 18 of drum 15. The axial end of drum 16, adjacent to head 17, is connected to a cone or funnel 20, being coaxial to the drum, and does rotate therewith. The narrow exit of the funnel is partially occupied by head 17; and the exit is, in part, covered by curtains 22 in order to avoid undesired entrance of air at that end of the funnel.

Due to the horizontally disposed conical contour of the drum discharge device 20, the refuse has to move over the lowest point of exit edge 21 of the cone. This way, one ensures a certain level height h of the refuse in drum unit 61 which, in particular, means that the sieve always contains a certain amount of refuse.

During operation, the refuse is fed to the apparatus via belt 29 and drops into hopper 9 (arrow 28). The refuse enters chopping chamber 10. Even prior to beginning to charge the device with refuse as well as throughout the processing operation, suction is applied by head 17 in order to reduce the air pressure slightly inside case 3. This causes fresh air to enter via chute 19 as well as through hopper 9. Particularly, the fresh air from the hopper passes through the chopper to carry paper and other light, easily suspensive parts along drum 6 through opening 13, i.e., prior to being contacted by the hammer drum. Thus, light-weight components are to some extent already separated from the refuse before chopping begins. Moreover, dust that may develop, for example, around hopper 9 is also sucked into the system, so that this suction has a certain environmental cleaning effect.

Not all of the light-weight refuse components are separated in this manner. Some are intermingled with heavier refuse; but during chopping, these light-weight parts are being separated and will also be captured by the flow of air from hopper 9 through drum 16, not the least, on account of the rotation of drum 15. Some light-weight materials may stick to heavier substances, or are otherwise intermingled with heavier refuse components which, after chopping, enter the aerating chamber and loosening drum 15. Bars 30 in drum 15 lift the chopped-up refuse upon rotation; and the latter falls freely from the drum's wall, being thereby aerated and loosened. This causes the light-weight components to separate and to float inside drum 15, whereby they will be caught by the air flowing towards head 17.

The separation as described continues for the entire length of the drum, while chopped, heavier refuse components fall through the sieve openings 18 into chute 19. The unsievable residue moves towards funnel 20, to be discharged as spillover, over the lower rim 21 of funnel 20 via exit chute 23 (arrow 23a). Accordingly, a certain minimum level height h of the refuse is maintained in drum 15 by operation and position of funnel 10. This is important as it ensures a certain level height above the sieve-effective lower portion of apertures 18. This ensures also that active sieving does take place and chopped, heavier (i.e., nonfloating) refuse components fall out of the drum (arrow 25) and onto conveyor belt 26.

That portion of the refuse which is discharged via chute 23 consists of the nonsievable and unchopped refuse portion such as metal parts, rocks, or the like. These large pieces of unsieved refuse fall onto a conveyor belt 24, to be removed as the third component of refuse processing.

In summary, one can see that there is, indeed, a three-fold refuse separation. Light-weight components (27), chopped and unchopped, float in the airstream through head 17. The sieved portion follows arrow 25 and drops out of chute 19 onto conveyor belt 26. The heavy, unchopped refuse component 23a drops out of the end funnel onto conveyor belt 24.

The inventive apparatus is of a compact design and mounted onto a carriage; it is, therefore, a mobile unit. Other refuse processing plants are usually constructed as multiple units placed side by side or one behind the other one; and these plant units are usually interconnected by conveyor belts. The present device processes refuse in a new way; particularly so, when used in conjunction with further processing. The mobile unit, as described, does not occupy much space and can be placed wherever needed. This is particularly advantageous in situations when not all of the other processing plants are in operation as receiving units. The mobile unit, thus, obviates the need for refuse separation plants which are not in continuous use. Except for maintenance and repair, and excepting further the brief periods of relocating the device as described, it can be used continuously.

The invention is not limited to the embodiments described above; but all changes and modifications thereof, not constituting departures from the spirit and scope of the invention, are intended to be included.

We claim:

1. Apparatus for processing refuse, comprising:
a frame and support structure;
drum means, rotating in the frame and support structure and including a first drum which contains a drum-shaped chopping means being a hammer drum and additional means for chopping, there being means for charging the first drum with refuse, and including a second drum, rotating with the first drum for aerating and loosening, the second drum being oriented axially downstream from the first drum;
suction means on the structure to suck air through the first and second drum, for causing light-weight components of the refuse to be carried floatingly from the first drum through the second drum and out, through the suction means;
means, including sieving means, for discharging other refuse components from the second drum; and
a horizontal funnel member, continuing the second drum and being also a component for the means for discharging, the funnel member establishing a minimum height for refuse being sieved.

2. Apparatus as in claim 1, said second drum being, at least in part, constructed as a sieve, said means for discharging including further an outlet means for refuse, having passed through the sieve.

3. Apparatus as in claim 1, said suction means including a head, projecting axially into the funnel member.

4. Apparatus as in claim 1, the means for charging being a hopper, the hopper being combined with the hammer drum to constitute a removable unit.

5. Apparatus as in claim 4, including a frame member; means for journalling the hammer drum in the frame member, said hopper being affixed to the frame member to establish the removable unit.

6. Appartus as in claim 5, said frame member further carrying a partition, having a discharge opening leading toward the second drum, the hammer drum being disposed close to said opening.

7. Apparatus as in claim 1, said structure including a carriage for selective positioning of the apparatus as a whole.

* * * * *